United States Patent [19]

McFadzean

[11] Patent Number: 5,158,258
[45] Date of Patent: Oct. 27, 1992

[54] HOLDING DEVICE

[76] Inventor: James McFadzean, 310 Bowden Rd., Cedar Grove, N.J. 07009

[21] Appl. No.: 685,617

[22] Filed: Apr. 15, 1991

[51] Int. Cl.⁵ ............................................. A47B 97/00
[52] U.S. Cl. ................................... 248/500; 52/4; 135/118; 248/508
[58] Field of Search .............. 248/545, 156, 508, 499, 248/500; 5/419, 417; 52/4, 155; 135/118

[56] References Cited

U.S. PATENT DOCUMENTS

| | | | |
|---|---|---|---|
| 269,691 | 12/1882 | Matthews | 52/4 |
| 427,815 | 5/1890 | Wolf | |
| 773,386 | 10/1904 | Fuqua | |
| 1,345,650 | 7/1920 | Wessels | 52/155 |
| 1,854,671 | 4/1932 | Roberts | 52/155 |
| 2,647,718 | 8/1953 | Disera | 248/508 |
| 2,809,006 | 10/1957 | Jansey | 248/361 |
| 2,840,092 | 6/1958 | Hill | 135/118 |
| 2,939,468 | 6/1960 | Boyce | 135/118 X |
| 3,237,904 | 3/1966 | Abruzese | 248/361 |
| 3,788,336 | 1/1974 | Steffes | 52/155 |
| 3,903,626 | 9/1975 | Ford | 40/10 |
| 4,063,567 | 12/1977 | Martin et al. | 135/15 |
| 4,185,424 | 1/1980 | Streit | 52/103 |
| 4,470,179 | 9/1986 | Gollin | 248/74.2 X |
| 4,566,660 | 1/1986 | Ansher | 248/74.2 |
| 4,699,165 | 10/1987 | Barzana | 5/417 X |
| 4,825,600 | 5/1987 | Osgood | 52/4 |
| 4,843,707 | 7/1987 | Lake | 248/74.2 X |
| 4,914,767 | 4/1990 | Balicki et al. | 5/419 |
| 4,927,118 | 5/1990 | Pierorazio | 248/545 |

FOREIGN PATENT DOCUMENTS 386421 1/1933 United Kingdom ............... 135/118

Primary Examiner—J. Franklin Foss
Attorney, Agent, or Firm—Arthur J. Plantamura

[57] ABSTRACT

A fabric holding device is provided for use primarily to hold down a spread out fabric web, such as a beach blanket, towel, or sheet. The device is devised to be easily inserted into sandy soil to prevent the spread out blanket from being flipped over, crumpled or otherwise disturbed or blown away by prevailing wind or by movement of an occupant on the spread out blanket.

The holding device is devised to be easily inserted and retained in the sand with one such device preferably being disposed at each corner of the spread out fabric sheet material, e.g., a beach blanket. A portion of the fabric such as a corner of the blanket is inserted into an open top slot which is formed in the upper part of the device, said fabric being securely gripped in the slot against dislodgement.

11 Claims, 3 Drawing Sheets

HOLDING DEVICE

FIELD OF THE INVENTION

This invention relates to a holding device and more specifically, to a device for holding down and preventing the movement of a beach blanket, beach towel, or other spread out fabric sheet material, or to hold other articles from being flipped over or blown away on the sand at the beach.

BACKGROUND OF THE INVENTION

The anchoring and restricting of the movement of a beach blanket, beach towel, and other articles which tend to flip or blow away at the beach has long been an annoying problem. Since there is constant wind movement and directional wind changes, due to land and sea wind patterns at coastal beach areas, blankets, towels and other sheet items, which may be spread out for reclining by a bather, and other articles, such as for example, shirts and blouses, have a tendency to be blown away. In the case of blankets and towels which are stretched out, even though such may not be blown away unless tethered down in some manner, they tend to be flipped over. Numerous devices have been proposed for securing and retaining in place a beach blanket or other sheet material which has been spread out on the sand. Illustrative devices of this kind include U.S. Pat. Nos. 2,809,006, 3,237,904, 4,914,767, and 4,927,118. Each known device, including those disclosed in these patents, however, is relatively complex and usually involves moving parts and relatively bulky and is often regarded as a nuisance discouraging portability by the bather. Also, because the known prior art devices are relatively complex, they are generally not economically feasible for the intended use which normally justifies only a minimal expense. Accordingly, there remains a need for a device for holding and restricting the movement of a beach blanket, towel, and the like which is simple in design and has no moving parts to break or malfunction.

SUMMARY OF THE INVENTION

It is an object of the invention to provide a device suitable for anchoring in the sand or soil and for holding and restricting the movements of a beach blanket, towel, sheet and the like.

It is a more specific object of the invention to provide a device that has no moving parts, and which is easily inserted into the sand and held in place and which functions to effectively hold in place on the ground an article such as a spread out blanket.

It is still a further object of the invention to provide a device for anchoring a spread out beach blanket, beach towel, sheet or the like, in the sand. An anchoring means is provided on the lower part of the device comprising an exterior integrally formed serrated or toothed structure to resist withdrawl when it is inserted into the sand. The device is formed on the upper part, with a fabric gripping means devised to permit easy insertion of a portion of the blanket or other sheet fabric article inserted therein and to hold a spread out article securely against being flipped over or crumpled or blown away by prevailing winds.

It is yet another object of the invention to provide a holding device to be anchored in the sand and to be held in place by the contiguous weight and pressure of the sand on the lower part of the holding device. A downward force is exerted on the top surfaces of barb-like protrusions formed on the lower part (that is inserted into the ground) to provide the device with pull out and dislodgement resistance.

Additional objects and advantages of the invention will become apparent from the description which follows:

DESCRIPTION OF THE PREFERRED EMBODIMENTS

Figure 1:
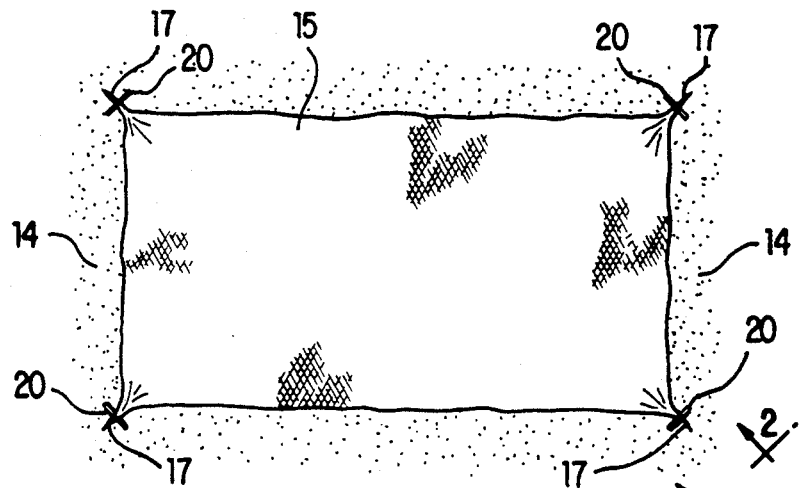
FIG. 1 illustrates the use of the device of the invention to hold a blanket in place on a sandy shore.

Referring to the drawings, it is seen that the invention comprises a device which functions to anchor and restrict the movement a beach blanket or beach towel and the like on the sand at the beach. When used to secure a web material, for example, a beach blanket or towel, preferably, four of these devices are used, one to secure each of the four corners of the blanket or towel. The device of the invention may function also generally as a holding means for a fabric article, e.g., a shirt or blouse, in which case one such device may suffice as the holding means for the article.

When referring herein to a beach blanket or towel held by the device of the invention, it will be understood that the invention contemplates the functioning of the device as a holding means not only for a blanket or other sheet material, but also as a holding means for an item of clothing.

Figure 2:
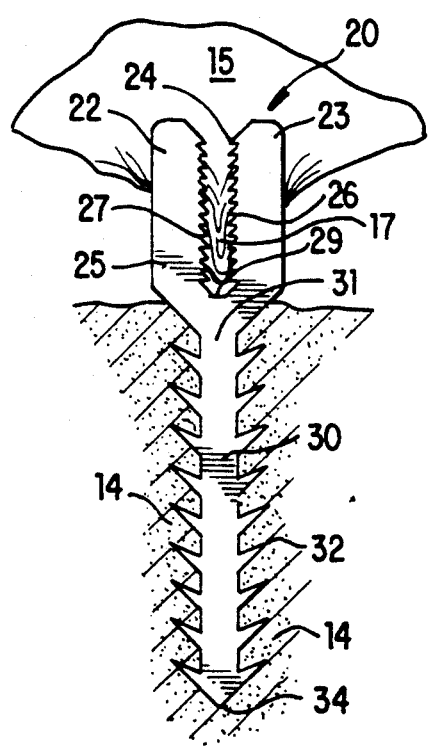
FIG. 2 is a view taken essentially along line 2—2 of FIG. 1 and shows a preferred embodiment of the device of the invention.
Figure 3A:
FIG. 3A is an edge elevation view of a preferred embodiment of the device.
Figure 3:
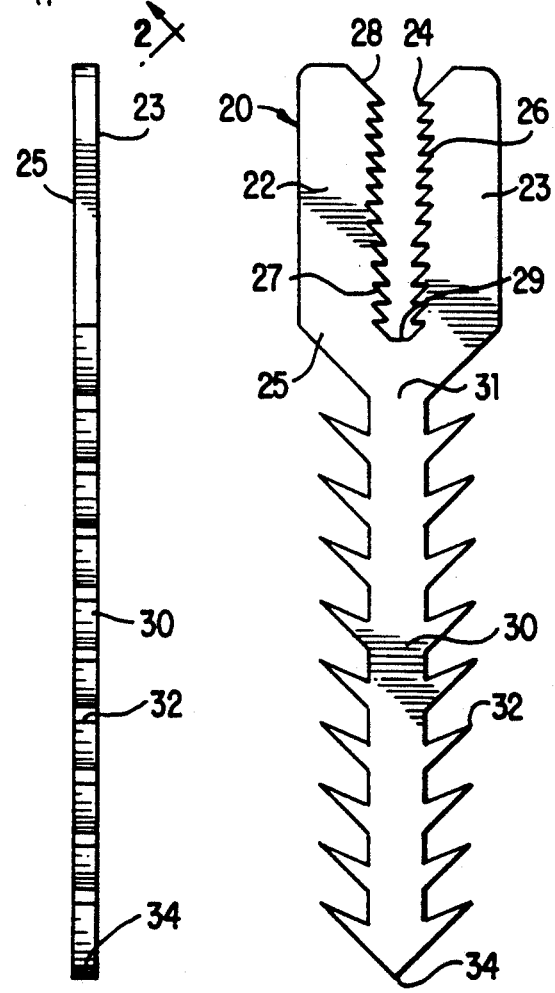
FIG. 3 is a side elevation view of a preferred embodiment of the device of the invention in which the lower part is provided with an exterior serrated or jagged edged surface adapted to be inserted into sandy soil and an upper part is provided with a slot having an interior serrated surface for gripping a fabric when forced down into the slot.

Referring to the drawing and particularly to FIGS. 1-3 thereof, it is seen that the holding device 20 of the invention comprises a substantially rigid elongated element which includes an upper portion 25 device to grip and hold an article such as the corner of a blanket therein and a lower portion 30 whose function is to facilitate insertion into the ground, for example, sandy soil at a beach, and to be substantially securely retained against dislodgement therein.

As seen in FIG. 1, four of the devices 20 of the invention are shown in position each holding down a corner 17 of a blanket 15 which is spread out on a sandy shore 14. The means by which the device 20 of the invention secures a corner 17 of the blanket is illustrated in greater detail in FIG. 2. As shown therein, the upper portion 25 of the device has a cut out portion 24 which is open at the top and forms an pair of upwardly extending legs 22 and 23 between which the fabric, such as the corner of a blanket is thrust downward into the slot and held in place. The device includes a lower anchoring portion 30, preferably formed with a tapered or pointed end 34 to facilitate insertion of the holding device into the sand 14. The outer edges of the lower portion 30 are provided with a serrated, or jagged surface, preferably toothed edges with points of the teeth inclined upward to facilitate the pressing of the portion 30 into the sand 14. The form of these serrated edges is such that when the stem 30 is inserted into the sand it resists withdrawl or dislodgement which might have a tendency to occur such as by a movement of the device or by tugging on the blanket whose corner is held in the slot 24 of the upper part 25 of the device 20.

Referring to a preferred embodiment of the inventions shown in greater detail in FIGS. 3 and 3A, it is seen that the upper portion 25 of the device is provided with two rows of serrated teeth, an upper wider spaced row 26 and a lower row 27 spaced at a relatively narrower distance, each row being substantially symmetrically located about the center line of the device 20. The upper part of the slot 24, i.e., the row of cooperating serrated teeth 26 provided in the holding slot 24 and located closer to the tapered mouth 28, has a larger width than the lower part of the holding slot which is provided with cooperating serrated teeth 27. This arrangement functions to accommodate a greater variation of thickness of fabric, e.g., a relatively thicker blanket fabric which would be retained in the upper part 26 of the slot and a relatively thinner fabric such as a sheet better retained in the lower part 27 of the slot 24.

The function of the serrated slot 24 is to provide a gripping action when an article, usually a cloth fabric, and more often, the corner of a web material such as a blanket, towel, or sheet is inserted and forced from the top down into the slot 24. The resiliency of the towel, blanket or the like, provides a force against the serrated teeth, providing a substantially secure hold against dislodgement of the article.

While the embodiment of FIG. 3 illustrates a slot 24 with two different widths, a wider upper width 26 and a narrower width 27, each with cooperating teeth or other gripping means, it is understood that only a single width may be suitable or alternatively a slot provided with three or more varying widths may also be used. When a slot with a single uniform width is employed, it may be necessary, for any given slot width, only to insert a larger portion of a thinner fabric material such as a sheet in the slot 24 than would be necessary with a thicker fabric such as a blanket.

The bottom 29 of the article holding slot 24 may comprises any suitable configuration and should be sufficiently distanced from the lower part 30 which is inserted into the sand to provide the desired clearance and also so that the cross section at the base of the legs 22 and 23 has substantial strength to resist the effects of a user who may pound the device at the top to suitably insert it into the sand, and to resist bending and twisting.

The exterior teeth 32 on the lower part 30 of the device 20 may take any desired shape which preferably does not needlessly increase the force needed to insert the device into the sand while at the same time providing the desired holding action of the device against removal once it has been forced into the sand. As shown in FIGS. 2 and 3, the teeth 32 formed in the lower stem 30 of the device are substantial and of a size, i.e., of a length, of the order of the width of the stem 30 itself, to produce the desired holding effect. The shapes of the teeth are preferably inclined upward, i.e., backward from the direction of insertion, to minimize resistance to the insertion of the device as it is forced into the sand.

The device of the invention may be formed from a variety of suitable materials which include wood and metal but, preferably comprises a synthetic resinous composition of sufficient rigidity but not brittleness from which the device may be readily shaped as by molding or casting. Suitable resinous compositions of this kind include various polyolefins, e.g., polyethylene or polypropylene, vinyl resins, e.g., polyvinyl chloride, nylon, polycarbonates, acrylics and blends thereof such as acrylonitrile-butadiene resins, and the like. The device should have a sufficient cross section to provide the desired strength and durability and should have a thicnkess, depending on the material of construction of at least about 0.10 inch and preferably at least about 0.20 inch. In the case of plastic, generally a thickness of the order of 0.20 inch to about 0.50 inch is suitable.

Figure 4:
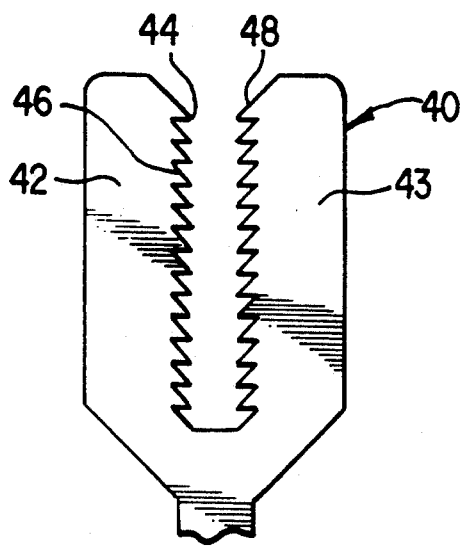
FIG. 4 illustrates the upper part of the device according to the invention comprising an alternative form in which the interior serrated fabric gripping slot has an essentially uniform width from top to bottom.

Referring to the alternative embodiments illustrated in FIGS. 4-7, it is seen that in the device 40 of FIG. 4 a slot 44 below the mouth 48 is formed having a uniform slot dimension from top to bottom with a suitable gripping surface on the interior edge of the slot 44 that is formed between the legs 42 and 43. The gripping edge comprises a prominent toothed edge 46 for gripping a fabric thrust downward into the slot 44.

Figure 5:
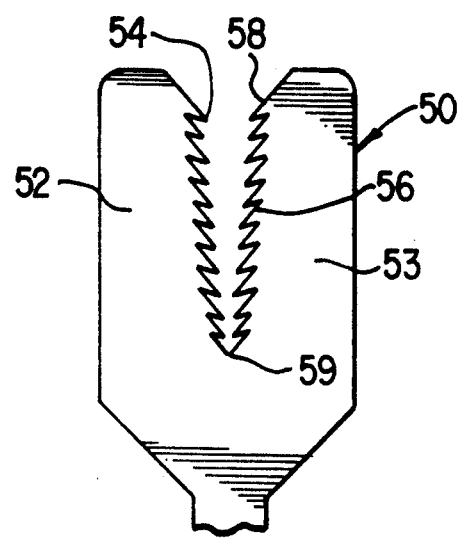
FIG. 5 illustrates the upper part of still another embodiment of the device of the invention in which the fabric gripping slot in the upper part of the device comprises a tapered form that gradually narrows from top to bottom.
Figure 6:
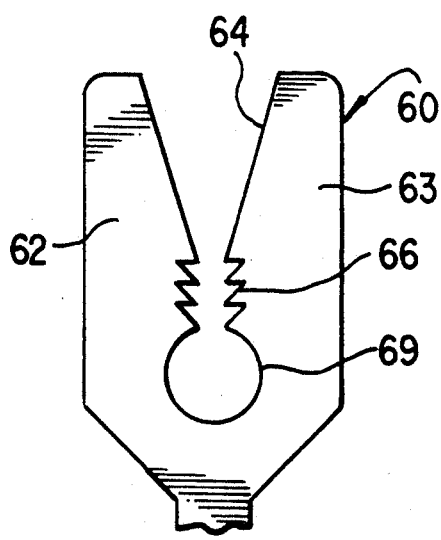
FIG. 6 illustrates the upper part of still a further embodiment of the device of the invention in which the tapered gripping slot in the upper part of the device terminates at its lower end with a serrated portion in combination with an enlarged fabric containing opening.

In the embodiment of FIG. 5, the upper portion of the device 50 of the invention comprises a tapered slot 54 which gradually diminishes in width from the mouth opening 58 to the bottom of the slot 59, the bottom being shown as a peak but may comprise a different shape, such as a diamond or triangular shape (not shown) or circular such as shown at 69 at the bottom of FIG. 6. The gripping surface 56 formed on the interior of the edge of the slot 54 between legs 52 and 53 of the device of FIG. 5, comprise smaller teeth which have a sharper point and which are inclined downward at at relatively steeper angle than are the teeth of the device illustrated in FIG. 4. It will be apparent, however, that depending on the degree of taper of the slot 54, it may be necessary to provide larger teeth to prevent slipping of the fabric held therein.

In the alternative embodiment of FIG. 6, the device 60 has a slot 64 comprising a tapered mouth opening formed between the legs 62 and 63 which terminates at the lower narrowed end of the slot with a plurality of gripping teeth 66 and a relatively enlarged circular opening into which a fabric portion to be held may be forced and retained.

Figure 7:
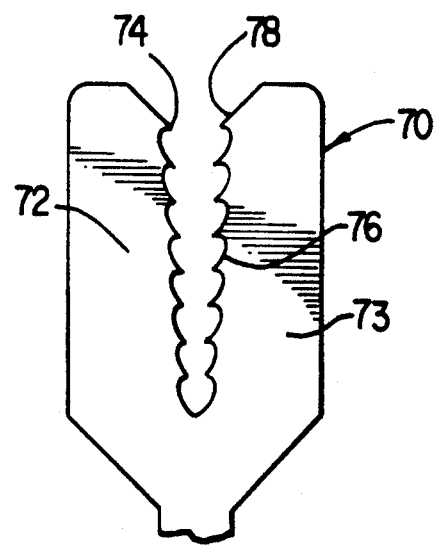
FIG. 7 illustrates the upper part of yet another embodiment of the device of the invention in which the gripping slot has a tapered shape that gradually narrows from top to bottom and wherein the toothed portion of the serrated surface is modified.

In the embodiment of FIG. 7, the slot 74 formed below the widened opening 78 and between the legs 72 and 73 has a modified scalloped or heart segment shaped gripping surface 76 at the edges of the slot, as the serrated fabric gripping and holding means.

Figure 8:
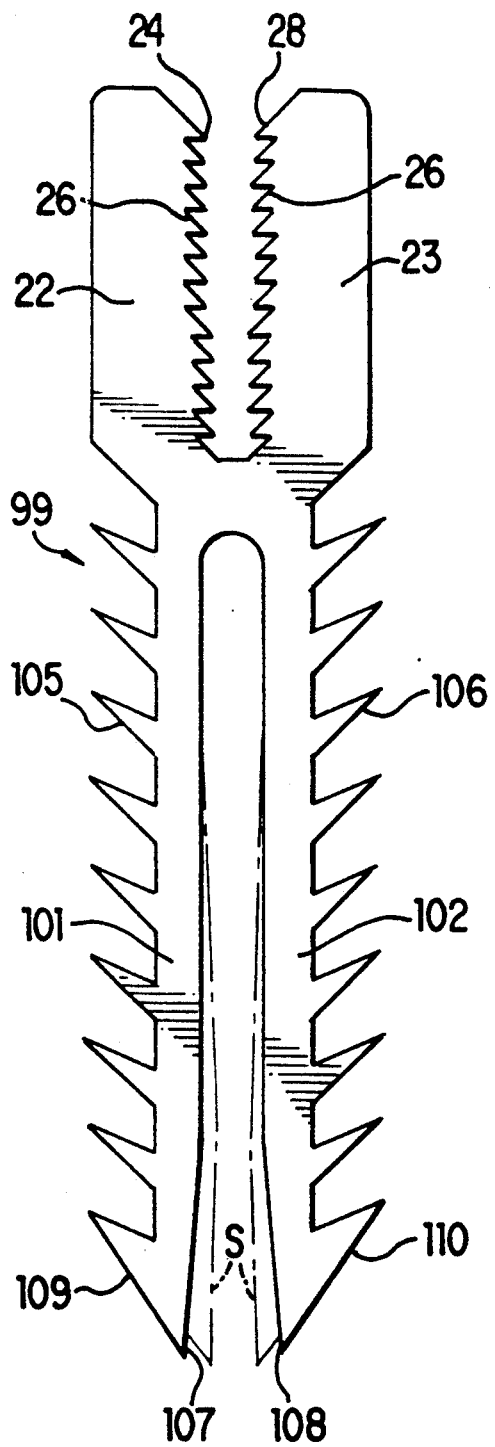
FIG. 8 illustrates still a further alternative embodiment of the device of the invention in which the lower part of the device, which is inserted into the sand, comprises a bifurcated (modified) structure which when pressed into the sand tends to force the two legs of this part in spring-like action, thereby enhancing the gripping hold of the teeth formed in the outer surface of the legs on the sand.

In the embodiment of FIG. 8, a modified lower anchoring portion 99 is illustrated. In this embodiment a bifurcated arrangement, comprising a left leg 101 and right leg 102, is employed. The legs 101 1nd 102 are provided at the outer edges with jagged or toothed surfaces 105 and 106, respectively. The toothed surfaces 105 and 106 are preferably devised to be inclined downward and inward to minimize resistance to the insertion of the device into the sand and to maximize the resistance to withdrawal and dislodgement when the lower part 99 is sunk into the sand. The lower ends 107 and 108, respectively, of the legs 101 and 102 of part 99 are also preferably contoured so as to have a sharper, i.e., longer, curved contour at the outer surfaces 109 and 110 than at the inner surfaces, 107 and 108 respectively. The effect of these contours is to force the bottom of the legs 101 and 102 closer together, as illustrated by the phantom lines S, as part 99 is being driven, i.e., inserted into the sand, thereby exerting force against the inherent spring (flexing) property of this member 99. This force results from the bending inward of the legs 101 and 102, thereby enhancing the grip of the jagged surfaces 105 and 106 which are being pressed against the contiguous sand from the inherent spring force.

It is thus seen that the invention provides a novel and desirable improved holding device, which is of particular advantage for anchoring a sheet material, such as a spread out beach blanket, which while simple in construction, and is highly effective and useful and minimal in cost.

While various embodiments of the invention have been disclosed in detail herein, it will be apparent that additional variations will be suggested to those skilled in the art from the invention disclosed. Accordingly, the invention is not be limited except as required by the scope of the appended claims.

What is claimed is:

1. A holding device comprising an integrally formed generally flat sided elongated element having no moving parts devised to be partially inserted into the ground and to have a fabric article securing part contiguous to the top of the device including:
   (a) a lower part which is formed to have a tapered shape at the bottom that facilitates insertion thereof into the ground and so as to resist the removal and the dislodgement of the device when inserted into the ground, and
   (b) an upper part provided with a fabric gripping slot which is open at the top to receive therein a portion of the fabric to be secured, said slot having an interior facing irregular edge surfaces devised to enhance the gripping against dislodgment of fabric placed therein, and into which a part of a resilient fabric is forced downward and retained therein.

2. The holding device of claim 1 wherein the open slot has in sequence, at least two different holding widths formed with spaced gripping companion surfaces.

3. The holding device of claim 1 in which the open slot in the upper part comprises a V-shaped configuration which has serrated gripping edges and wherein the slot gradually lessens in width from the top opening to the bottom of the slot.

4. The holding device of claim 1 in which the open slot in the upper part gradually narrows from the top down and includes in the slot a portion with serrated gripping edges in combination with an enlarged portion at the bottom.

5. The holding device of claim 1 wherein the gripping surface of the fabric gripping slot comprises a scalloped configuration.

6. The holding device of claim 1 wherein the lower part comprises a pair of bifurcated legs.

7. The holding device of claim 1 wherein the lower part comprises a pair of bifurcated legs.

8. The holding device of claim 2 wherein the lower part comprises a pair of bifurcated legs.

9. The holding device of claim 4 wherein the lower part comprises a pair of bifurcated legs.

10. A device for holding a corner of a fabric web material which is disposed in a spread position on the ground, comprising an integrally formed generally flat-sided elongated element having no moving parts and devised to be partially inserted at its lower end into the ground and to have means at the top of an upper part for gripping a portion of the fabric web material, said device including:
    (a) a lower part comprising a tapered lower anchoring portion having a substantially pointed bottom to facilitate insertion of the device into the ground and being provided with pointed teeth at the outer opposite edges of the lower part wherein the teeth are incline upward thereby resisting the removal and dislodgement of the device when the lower part of the device is insert in the ground, and
    (b) an upper part provided with a fabric gripping linear slot open at the top, said slot having interior facing serrated gripping edge surfaces, and into which a resilient fabric is forced downward and retained therein.

11. The device of claim 10 wherein the fabric gripping slot in the upper part has an upper portion having a relatively wider dimension and a lower portion having a relatively narrower dimension.

* * * * *